United States Patent [19]
Stanger

[11] Patent Number: 5,615,907
[45] Date of Patent: Apr. 1, 1997

[54] AIRBAG INFLATOR RETENTION TABS

[75] Inventor: Randy M. Stanger, Hooper, Utah

[73] Assignee: Morton International, Inc., Chicago, Ill.

[21] Appl. No.: 670,007

[22] Filed: Jun. 25, 1996

[51] Int. Cl.⁶ .................................................. B60R 21/16
[52] U.S. Cl. ........................................ 280/728.2; 280/731
[58] Field of Search ................................ 280/728.2, 731, 280/729.1

[56] References Cited

U.S. PATENT DOCUMENTS

| | | | |
|---|---|---|---|
| 5,141,247 | 8/1992 | Barth | 280/728.2 |
| 5,259,641 | 11/1993 | Schenk et al. | 280/731 |
| 5,280,946 | 1/1994 | Adams et al. | 280/728 A |
| 5,320,379 | 6/1994 | Burnard et al. | 280/728.2 |
| 5,445,406 | 8/1995 | Jones | 280/728.2 |
| 5,542,692 | 8/1996 | Shaklik et al. | 280/728.2 |
| 5,547,213 | 8/1996 | Lang et al. | 280/728.2 |
| 5,553,886 | 9/1996 | Gunn et al. | 280/728.2 |

FOREIGN PATENT DOCUMENTS 2696392  4/1994  France ............................. 280/728.2

Primary Examiner—Christopher P. Ellis
Attorney, Agent, or Firm—George W. Rauchfuss, Jr.; Gerald K. White

[57] ABSTRACT

A module housing for mounting an airbag inflator, having a cylindrical sidewall and a inflator flange extending radially outwardly from the cylindrical sidewall, within an airbag module. The module housing includes a module baseplate having a bottom surface and defining a generally circular inflator-receiving aperture sized to receive the cylindrical sidewall of the airbag inflator with the inflator flange of the airbag inflator butting against the bottom surface of the module baseplate. Two opposing, resiliently bendable retention tabs are positioned around the inflator-receiving opening for clamping the inflator flange against the bottom surface of the module baseplate to retain the airbag inflator within the module housing prior to and during assembly of the airbag module, and during disassembly of the airbag module.

15 Claims, 3 Drawing Sheets

AIRBAG INFLATOR RETENTION TABS

FIELD OF THE INVENTION

The present invention relates to an airbag module and, more particularly, to a module housing of an airbag module having airbag inflator retention tabs for securing an airbag inflator within the airbag module.

BACKGROUND OF THE INVENTION

An airbag module is employed in an automobile for protecting an occupant against injury by deploying an inflated airbag cushion to physically restrain the occupant's body when the automobile encounters a collision. A driver side airbag module normally includes a module cover attached to a module baseplate, and an inflator and an airbag cushion secured to the module baseplate and covered by the module cover. The driver side airbag module can also include a horn switch secured to an inner face of the module cover.

In some existing driver side airbag modules, the module baseplate includes a sidewall extending upwardly from the baseplate and forming a rim. Locking arms having grooves or notches for engaging the rim extend from the cover. The airbag module also includes cover clamps or retaining clips clamping two of the locking arms to the rim to secure the cover to the baseplate. The airbag inflator, the airbag cushion and the clamps are secured to the baseplate with a single set of nuts and bolts. Such an airbag module is disclosed in U.S. Pat. No. 5,280,946.

It would be useful for the airbag inflator to be simply retained within the module housing independently of the nuts and bolts. With the airbag inflator retained within the module housing, the airbag inflator and the module housing could be handled as a single component before and during assembly of the airbag module. In addition, during servicing of the horn switch, the airbag cushion or the module cover, the nuts must be unfastened from the bolts to release the cover clamps in order to remove the module cover. With the airbag inflator retained within the module housing independently of the nuts and bolts, the airbag inflator would remain correctly positioned within the module housing with respect to the airbag cushion during removal of the module cover.

A general object, therefore, of the present invention is to provide a new and improved airbag module.

A more specific object of the present invention is to provide a new and improved module housing for use with an airbag module.

Another object of the present invention is to provide an airbag module housing that provides inflator retention prior to final assembly of the airbag module, and during removal of the module cover from the airbag module.

An additional object of the present invention is to provide an airbag module housing that provides inflator retention means that easily engages an airbag inflator.

A further object of the present invention is to provide an airbag module housing that provides inflator retention without requiring additional components that must be assembled to the module housing.

SUMMARY OF THE INVENTION

In carrying out this invention, there is provided a module housing for mounting an airbag inflator, having a cylindrical sidewall and an inflator flange extending radially outwardly from the cylindrical sidewall, within an airbag module. The module housing includes a module baseplate having a bottom surface and defining an inflator-receiving aperture sized to receive the cylindrical sidewall of the airbag inflator with the inflator flange of the airbag inflator butting against the bottom surface of the module baseplate.

Resiliently bendable retention means extend from the bottom surface of the module baseplate around the inflator receiving aperture for deflecting and then clamping the inflator flange against the bottom surface of the module baseplate when the airbag inflator is inserted into the inflator-receiving aperture.

According to one aspect of the present invention, the resiliently bendable retention means are in the form of at least two, generally opposed, retention tabs extending downwardly from the bottom surface of the module baseplate around the inflator-receiving aperture. The retention tabs are spaced radially outwardly from the inflator-receiving aperture so that when the airbag inflator is inserted into the inflator-receiving aperture, the inflator flange will contact the retention tabs forcing the retention tabs to bend radially outwardly from the inflator-receiving aperture so that the inflator flange may pass by the retention tabs and butt against the bottom surface of the module baseplate. Once the inflator flange has passed the retention tabs, the retention tabs will resiliently bend inwardly towards their original positions to clamp the inflator flange against the module baseplate and retain the airbag inflator within the module housing.

According to another aspect of the present invention, each retention tab includes an upper portion extending downwardly from the bottom surface of the module baseplate and also radially inwardly toward the inflator-receiving aperture to a lower portion. The lower portion extends upwardly from the upper portion and also radially inwardly toward the inflator-receiving aperture to a distal end of the retention tab. Each of the distal ends of the at least two retention tabs are spaced-apart from the bottom surface of the module baseplate less than a thickness of the inflator flange.

The at least two opposed retention tabs are spaced radially outwardly from the inflator-receiving aperture so that when the airbag inflator is inserted into the inflator-receiving aperture, the inflator flange will contact the lower portions of the retention tabs. The inflator flange will force the lower portions and, in turn, the upper portions to bend radially outwardly from the inflator-receiving aperture with the distal ends of the retainer tabs moving radially outwardly from the inflator receiving aperture and also downwardly away from the bottom surface of the module baseplate, so that the inflator flange may then pass by the distal ends and butt against the bottom surface of the module baseplate.

Once the inflator flange has passed the distal ends of the retention tabs, the upper portions and the lower portions of the retention tabs will resiliently bend inwardly to their original positions with the distal ends moving radially inwardly towards the inflator receiving aperture and also upwardly towards the bottom surface of the module baseplate to clamp the inflator flange against the module baseplate.

According to an additional aspect of the present invention, the retention tabs are unitary with the module baseplate.

According to a further aspect of the present invention, the module housing further includes a module sidewall extending upwardly from an outer edge of the module baseplate to an outwardly curled rim defining an open top of the module housing.

An airbag module according to the present invention is also provided and includes a module housing as described above. The inflator-receiving aperture defined by the module baseplate of the module housing receives a cylindrical sidewall of an airbag inflator, with an inflator flange of the airbag inflator butting against the bottom surface of the module baseplate. The resiliently bendable retention means extending from the bottom surface of the module baseplate around the inflator receiving aperture clamp the inflator flange against the bottom surface of the module baseplate, retaining the inflator within the inflator-receiving aperture.

The airbag module also includes an inflatable, folded airbag cushion having a collar defining an open mouth receiving the cylindrical sidewall of the airbag inflator, and means for securing the collar of the airbag cushion and the inflator flange to the baseplate. An airbag module cover is secured to the module housing, covering the folded airbag cushion.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
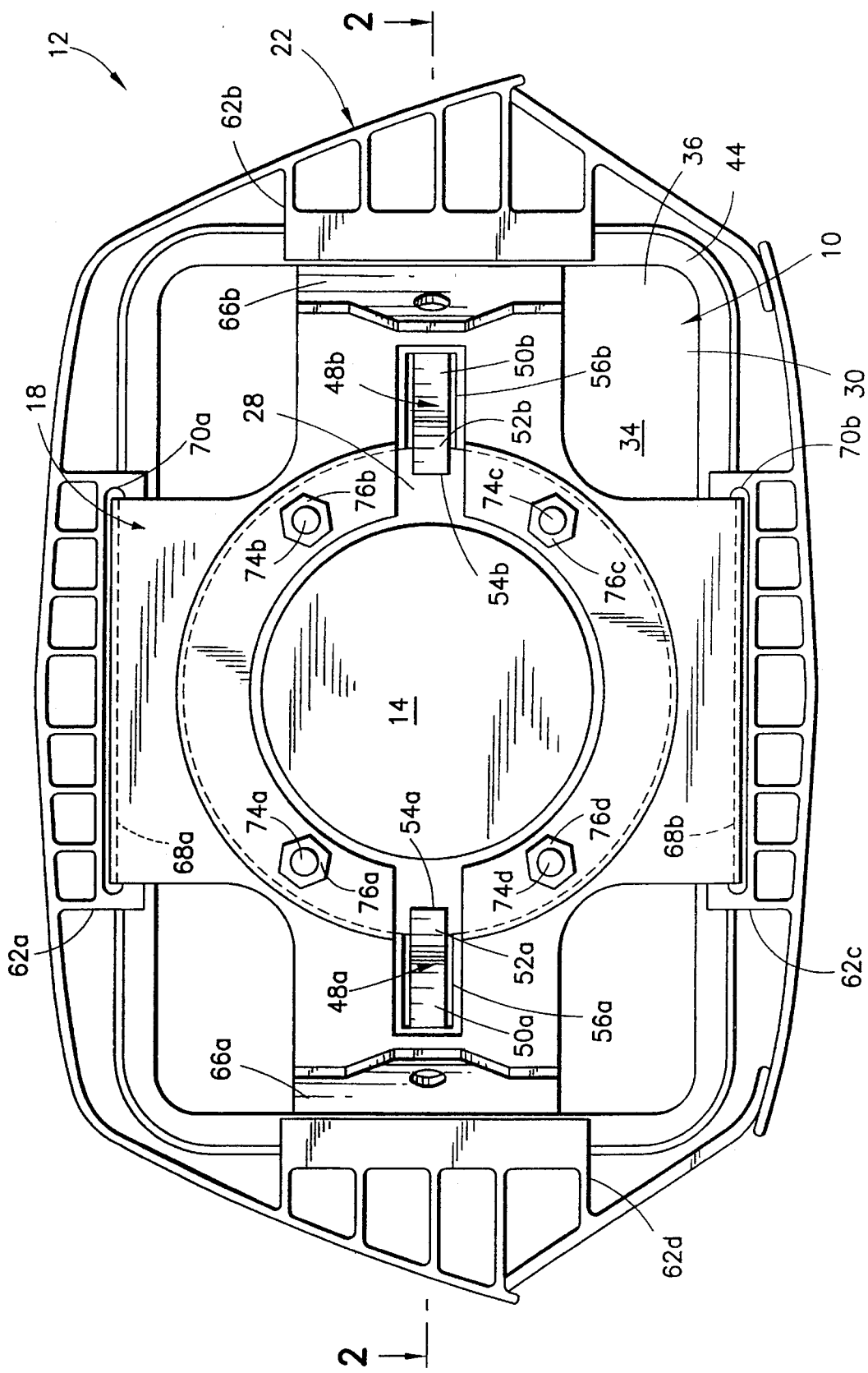
FIG. 1 is a bottom plan view of an airbag module including a module housing according to the present invention.
Figure 2:
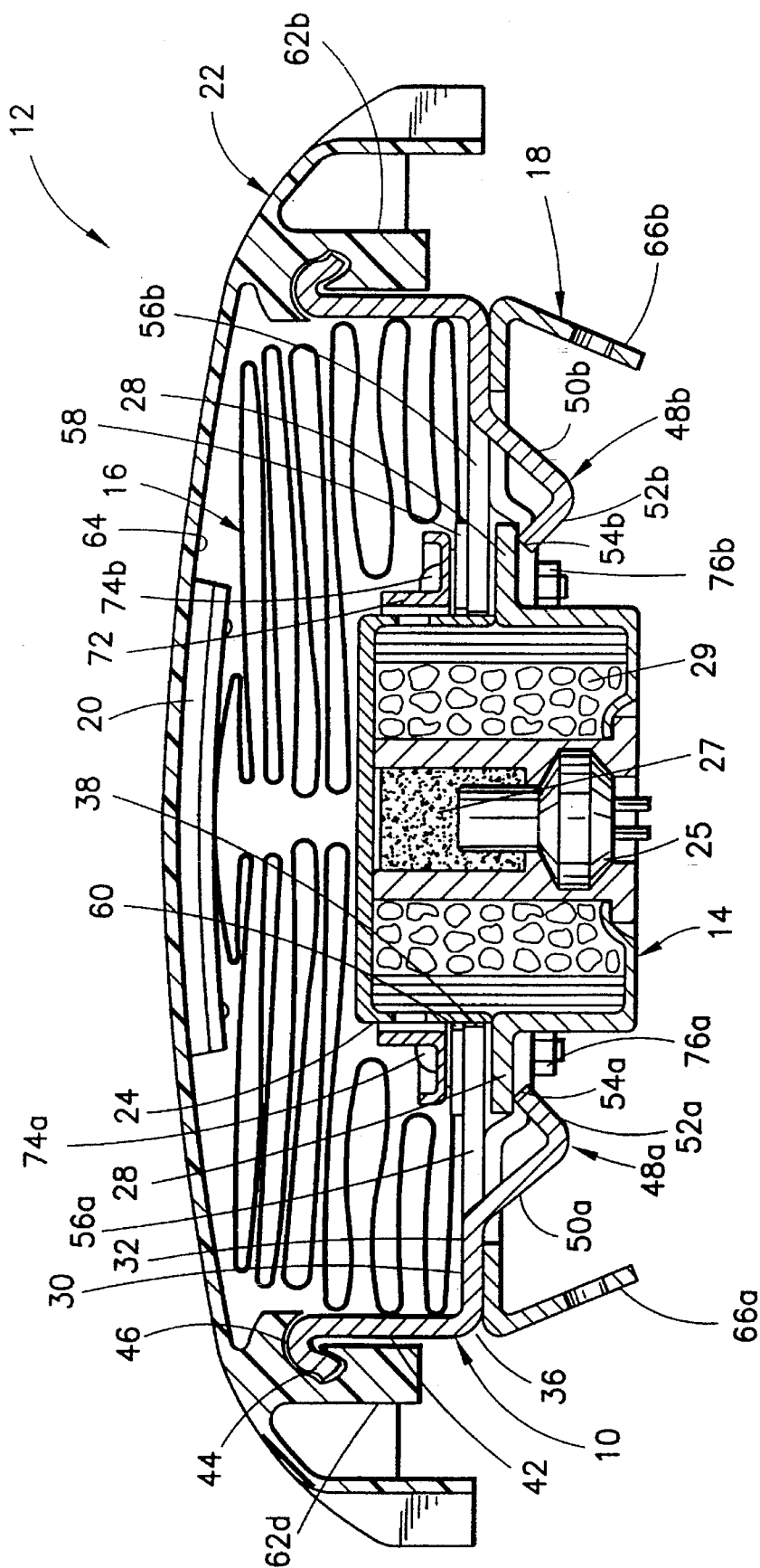
FIG. 2 is a sectional view of the airbag module of FIG. 1 taken along the line 2—2 of FIG. 1.

Referring first to FIGS. 1 and 2, the present invention is directed to a module housing 10 for mounting an airbag inflator 14 within an airbag module 12. The airbag module 12 includes, in addition to the module housing 10, the airbag inflator 14, an airbag cushion 16, a mounting bracket 18, a horn switch 20 and a module cover 22. All of these additional components are known in the art and therefore not described here in detail except as relating to the module housing 10 according to the present invention.

Figure 3:
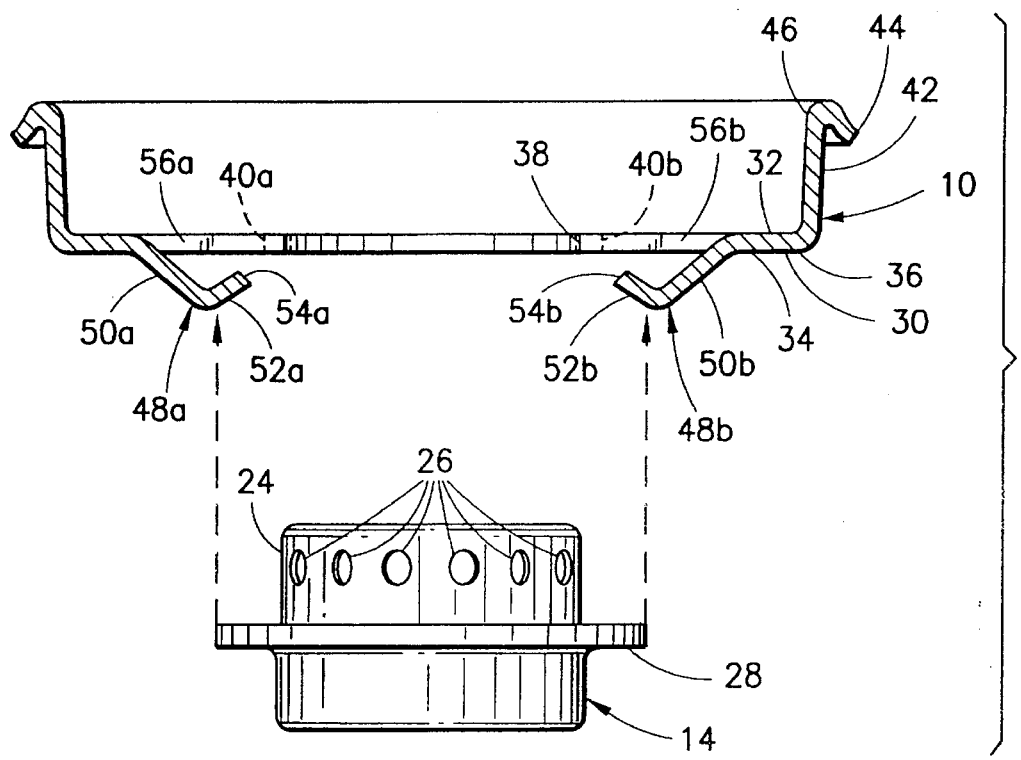
FIG. 3 is an exploded view, partially in section, of the module housing and an airbag inflator of the airbag module of FIGS. 1 and 2.

The airbag inflator 14 is for providing inflation gas for inflating the airbag cushion 16 upon being initiated by a remote collision or deceleration sensor. As shown, the airbag inflator 14 is a pyrotechnic type inflator, as known in the art, containing an initiator 25, ignition material 27 and solid gas generant 29 in pellet form for producing inflation gas. Other types of airbag inflators could alternatively be used, such as a hybrid type inflator containing an initiator, ignition material and compressed inert gas for example. Referring also to FIG. 3, the airbag inflator 14 has a cylindrical sidewall 24 defining a plurality of gas exhaust ports 26, and a inflator flange 28 extending radially outwardly from the cylindrical sidewall below the gas exhaust ports. Although not shown, the inflator flange 28 defines four fastener receiving holes.

Figure 4:
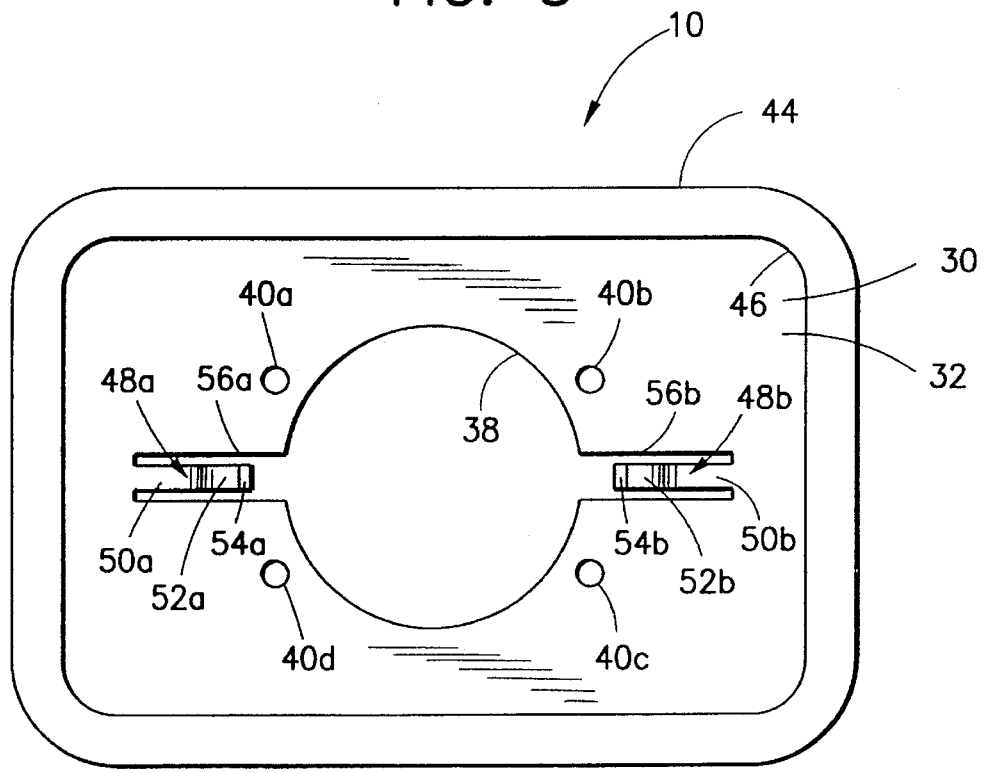
FIG. 4 is a top plan view of the module housing of the airbag module of FIGS. 1 and 2.

Referring also to FIG. 4, the module housing 10 includes a generally rectangular module baseplate 30 having a top surface 32, a bottom surface 34 and an outer edge 36. The module baseplate 30 can also be provided in other suitable shapes, such as trapezoidal or circular for example, generally depending upon the shape of the airbag module. The module baseplate 30 defines a generally circular inflator-receiving aperture 38 receiving the cylindrical sidewall 24 of the airbag inflator 14 with the inflator flange 28 of the airbag inflator butting against the bottom surface 34 of the module baseplate. The module baseplate 30 also defines four fastener receiving holes 40a,40b,40c,40d surrounding the inflator-receiving aperture 38. The module housing 10 can include a module sidewall 42 extending upwardly from the outer edge 36 of the module baseplate 30 to an outwardly curled rim 44 defining an open top 46 of the module housing 10.

Resiliently bendable retention means in the form of inflator retention tabs 48a,48b are unitary with and extend from the baseplate 30 around the inflator-receiving aperture 38. The retention tabs 48a,48b clamp the inflator flange 28 against the bottom surface of the module baseplate 30 to retain the airbag inflator 14 within the module housing 10. The module housing 10 can include more than two retention tabs but should include at least two generally opposed retention tabs. Each retention tab 48a,48b includes an upper portion 50a,50b extending downwardly from the bottom surface 34 of the module baseplate 30 and also radially inwardly toward the inflator-receiving aperture 38 to a lower portion 52a,52b extending upwardly from the upper portion and also radially inwardly toward the inflator-receiving aperture to a distal end 54a,54b of the retention tab. The distal ends 54a,54b of the retention tabs 48a,48b are spaced-apart from the bottom surface 34 of the module baseplate 30 less than a thickness of the inflator flange 28, so that the distal ends clamp the inflator flange against the bottom surface of the module baseplate retaining the airbag inflator 14 within the inflator-receiving aperture 38.

The module housing 10 is made from a suitably light weight and sturdy material such as aluminum, steel or an engineering plastic for example. If the module housing 10 is made of aluminum or steel, for example, the retention tabs 48a,48b can be stamped from the baseplate 30 and formed by bending. Slots 56a,56b extending from the inflator-receiving aperture 38 will be defined by the baseplate 30 where the retention tabs 48a,48b are stamped. If the module housing 10 is made of engineering plastic, the retention tabs can be molded unitary with the baseplate either with or without the slots 56a,56b. The present invention, therefore, provides retention tabs 48a,48b for retaining the airbag inflator 14 without adding additional, separate parts that must be assembled to the airbag module 12. Retention tabs made separate from the baseplate 30 and secured integrally to the baseplate with welds or fasteners are also within the scope and spirit of the present invention.

During assembly of the airbag inflator 14 to the module housing 10, the airbag inflator is inserted into the inflator-receiving aperture 38 of the module housing 10 from below. The two opposed retention tabs 48a,48b are spaced radially outwardly from the inflator-receiving aperture 38 so that as the airbag inflator 14 is inserted into the inflator-receiving aperture, the inflator flange 28 contacts the lower portions 52a,52b of the retention tabs. The inflator flange 28 forces the lower portions 52a,52b and, in turn, the upper portions 50a,50b to bend radially outwardly from the inflator-receiving aperture 38 so that the distal ends 54a,56b of the retainer tabs move radially outwardly from the inflator receiving aperture and also downwardly away from the bottom surface 34 of the module baseplate 30. The inflator flange 28 may then pass by the distal ends 54a,56b and butt against the bottom surface 34 of the module baseplate 30.

Once the inflator flange 28 has passed the distal ends 54a,54b of the retention tabs 48a,48b, the upper portions 50a,50b and the lower portions 52a,52b of the retention tabs resiliently bend radially inwardly toward their original positions with the distal ends moving radially inwardly toward the inflator receiving aperture 38 and also upwardly toward the bottom surface 34 of the module baseplate 30 to clamp the inflator flange against the module baseplate. The airbag inflator 14, therefore, is easily snapped into the inflator-receiving aperture 38 of the module housing 10 and retained by the retention tabs 48a,48b so that the module housing 10 and the retained airbag inflator can be handled as a single component before and during assembly of the airbag module 12. In addition, the airbag inflator 14 can be easily removed from the inflator-receiving aperture 38 of the module housing 10 simply by bending the retention tabs 48a,48b radially outwardly from below the inflator flange 28.

The inflatable, folded airbag cushion 16 has a collar 58 defining an open mouth 60. The collar 58 of the airbag cushion 16 is positioned on the top surface 32 of the baseplate 30 surrounding the airbag inflator 14 with the open mouth 60 receiving the portion of the sidewall 24 of the airbag inflator defining the plurality of gas exhaust ports 26. Although not shown, the collar 58 defines four fastener receiving holes. The airbag module cover 22 includes four locking arms 62a,62b,62c,62d engaging the rim 44 of the module housing 10 to secure the module cover to the module housing, closing the open top 46 and covering the folded airbag cushion 16. It should be noted, however, that the module cover 22 can be attached to the module housing 10 in other ways without departing from the scope and spirit of the present invention. The horn switch 20 is secured to an inner face 64 of the module cover The mounting bracket 18 fits around the airbag inflator 14 and butts against the bottom surface 34 of the module baseplate 30. The mounting bracket 18 includes a pair of mounting plates 66a,66b for mounting the airbag module 12 within a hub of a vehicle steering wheel (not shown), and a pair of cover clamps 68a,68b which fit into recesses 70a,70b in two of the locking arms 62a,62c of the module cover 22 to clamp those locking arms against the module housing 10. Although not shown, the mounting bracket 18 also defines four fastener receiving holes.

Means for securing the collar 58 of the airbag cushion 16, the inflator flange 28 and the mounting bracket 18 to the module baseplate 30 includes a cushion retention ring 72 positioned on top of the collar of the airbag cushion, and four bolts 74a,74b,74c,74d and four nuts 76a,76b,76c,76d. Although not shown, the cushion retention ring 72 defines four fastener receiving holes. The four bolts 74a,74b,74c,74d pass through the four fastener receiving holes of the retention ring 72, the four fastener receiving holes of the collar 58, the four fastener receiving holes 40a,40b,40c,40d of the baseplate 30, the four fastener receiving holes of the inflator flange 28, and the four fastener receiving holes of the mounting bracket 18 and are fastened with the nuts 76a, 76b,76c,76d to secure the airbag module 12 as an assembled unit. It should be noted, however, that other means for securing the collar 58 of the airbag cushion 16 and the inflator flange 28 to the baseplate 30 can be provided and the airbag module 12 can be secured together as an assembled unit in other ways without departing from the scope and spirit of the present invention. For example, the inflator flange 28 and the collar 58 could be clamped to the module baseplate 30 instead of being bolted. Many variations are possible.

In order to service the horn switch 20, the airbag cushion 16 or the module cover 22, the nuts 76a,76b,76c,76d must be unfastened from the bolts 74a,74b,74c,74d to release the cover clamps 68a,68b of the mounting bracket 18 in order to remove the module cover. During removal of the module cover 22, the retention tabs 48a,48b retain the airbag inflator 14 within the module housing 10. In summary, while the nuts 76a,76b,76c,76d and bolts 74a,74b,74c,74d secure the airbag inflator 14 within the assembled airbag module 12, the retention tabs 48a,48b retain the airbag inflator to the module housing 10 prior to final assembly of the airbag module and during disassembly of the airbag module.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A module housing for mounting an airbag inflator within an airbag module, the airbag inflator having a cylindrical sidewall and a inflator flange extending radially outwardly from the cylindrical sidewall, the module housing comprising:

A) a module baseplate having a bottom surface and defining an inflator-receiving aperture sized to receive the cylindrical sidewall of the airbag inflator with the inflator flange of the airbag inflator butting against the bottom surface of the module baseplate; and B) a plurality of resiliently bendable retention tabs extending from the bottom surface of the module baseplate around the inflator-receiving aperture for deflecting and then clamping the inflator flange against the bottom surface of the module baseplate when the airbag inflator is inserted into the inflator-receiving aperture and wherein each retention tab has an upper tab portion extending downwardly from the bottom surface of the module baseplate and radially inwardly towards the inflator-receiving aperture to a lower tab portion extending upwardly from the upper tab portion and also radially inwardly toward the inflator-receiving aperture to a distal end of the retention tab, the distal ends of each of the retention tabs spaced apart from the bottom surface of the module baseplate less than a thickness of the inflator flange.

2. A module housing as defined in claim 1 wherein the plurality of resiliently bendable retention tabs comprise at least two generally opposed, retention tabs, the at least two opposed retention tabs spaced radially outwardly from the inflator-receiving aperture so that when the airbag inflator is inserted into the inflator-receiving aperture, the inflator flange will contact the retention tabs forcing the retention tabs to bend radially outwardly from the inflator-receiving aperture so that the inflator flange may pass by the retention tabs and butt against the bottom surface of the module baseplate, and once the inflator flange has passed the retention tabs, the retention tabs will resiliently bend inwardly towards their original positions to clamp the inflator flange against the module baseplate and retain the airbag inflator within the module housing.

3. A module housing as defined in claim 1 wherein the plurality of resiliently bendable retention tabs comprise at least two opposed retention tabs spaced radially outwardly from the inflator-receiving aperture so that as the airbag inflator is inserted into the inflator-receiving aperture, the inflator flange will contact the lower portions of the retention tabs and force the lower portions and, in turn, the upper portions to bend radially outwardly from the inflator-receiving aperture with the distal ends of the retainer tabs moving radially outwardly from the inflator-receiving aperture and also downwardly away from the bottom surface of the module baseplate, so that the inflator flange may then pass by the distal ends and butt against the bottom surface of the module baseplate, and once the inflator flange has passed the distal ends of the retention tabs, the upper portions and the lower portions of the retention tabs will resiliently bend inwardly towards their original positions with the distal ends moving radially inwardly towards the inflator-receiving aperture and also upwardly towards the bottom surface of the module baseplate to clamp the inflator flange against the module baseplate.

4. A module housing as defined in claim 3 wherein the retention tabs are unitary with the module baseplate.

5. A module housing as defined in claim 3 further comprising a module sidewall extending upwardly from an outer edge of the module baseplate to an outwardly curled rim defining an open top of the module housing.

6. A module housing as defined in claim 3 wherein the module baseplate is generally rectangular and the inflator-receiving aperture is generally circular.

7. An airbag module comprising:

A) airbag inflator having a cylindrical sidewall and a inflator flange extending radially outwardly from the cylindrical sidewall;

B) a module housing comprising:

a module baseplate having a top surface and a bottom surface, the module baseplate defining an inflator-receiving aperture around the cylindrical sidewall of the airbag inflator with the inflator flange of the airbag inflator butting against the bottom surface of the module baseplate; and a plurality of resiliently bendable retention tabs extending from the bottom surface of the module baseplate around the inflator-receiving aperture wherein the plurality of resiliently bendable retention tabs comprise at least two retention tabs and wherein each of the at least two retention tabs includes an upper tab portion extending downwardly from the bottom surface of the module baseplate and radially inwardly toward the inflator-receiving aperture to a lower tab portion extending upwardly from the upper portion and radially inwardly toward the inflator-receiving aperture to a distal end of the retention tab, the distal ends of the at least two retention tabs spaced apart from the bottom surface of the module baseplate less than a thickness of the inflator flange, each of the distal ends of the at least two generally opposed retention tabs clamping the inflator flange against the bottom surface of the module baseplate and retaining the inflator within the inflator-receiving aperture;

C) an inflatable, folded airbag cushion having a collar defining an open mouth receiving the cylindrical sidewall of the airbag inflator;

D) means for securing the collar of the airbag cushion and the inflator flange to the baseplate; and E) an airbag module cover secured to the module housing covering the folded airbag cushion.

8. An airbag module as defined in claim 7 wherein the retention tabs of the module housing are unitary with the module baseplate.

9. An airbag module as defined in claim 7 wherein the module housing further comprises a module sidewall extending upwardly from an outer edge of the module baseplate to an outwardly curled rim defining an open top of the module housing.

10. An airbag module as defined in claim 7 wherein the module baseplate of the module housing is generally rectangular and the inflator-receiving aperture is generally circular.

11. An airbag module comprising:

A) an airbag inflator having a cylindrical sidewall and a inflator flange extending radially outwardly from the cylindrical sidewall;

B) a module housing comprising:

a module baseplate having a top surface and a bottom surface, the module baseplate defining an inflator-receiving aperture around the cylindrical sidewall of the airbag inflator with the inflator flange of the airbag inflator butting against the bottom surface of the module baseplate; and a plurality of resiliently bendable retention tabs extending from the bottom surface of the module baseplate around the inflator-receiving aperture clamping the inflator flange against the bottom surface of the module baseplate and wherein each retention tab has an upper tab portion extending downwardly from the bottom surface of the module baseplate and radially inwardly towards the inflator-receiving aperture to a lower tab portion extending upwardly from the upper tab portion and also radially inwardly toward the inflator-receiving aperture to a distal end of the retention tab, the distal ends of each of the retention tabs spaced apart from the bottom surface of the module baseplate less than a thickness of the inflator flange.

12. An airbag module as defined in claim 11 wherein the plurality of resiliently bendable retention tabs comprise at least two generally opposed retention tabs, the at least two opposed retention tabs spaced radially outwardly from the inflator-receiving aperture with the distal ends of the retention tabs providing the clamping of the inflator flange against the module baseplate retaining the airbag inflator within the module housing.

13. An airbag module as defined in claim 11 wherein the retention tabs of the module housing are unitary with the module baseplate.

14. An airbag module as defined in claim 11 wherein the module housing further comprises a module sidewall extending upwardly from an outer edge of the module baseplate to an outwardly curled rim defining an open top of the module housing.

15. An airbag module as defined in claim 11 wherein the module baseplate of the module housing is generally rectangular and the inflator-receiving aperture is generally circular.

* * * * *